Oct. 28, 1958
W. M. HARKS
2,858,048
INVENTORY CONTROL APPARATUS FOR
A LIQUID DISPENSING SYSTEM
Filed April 20, 1953
2 Sheets-Sheet 1
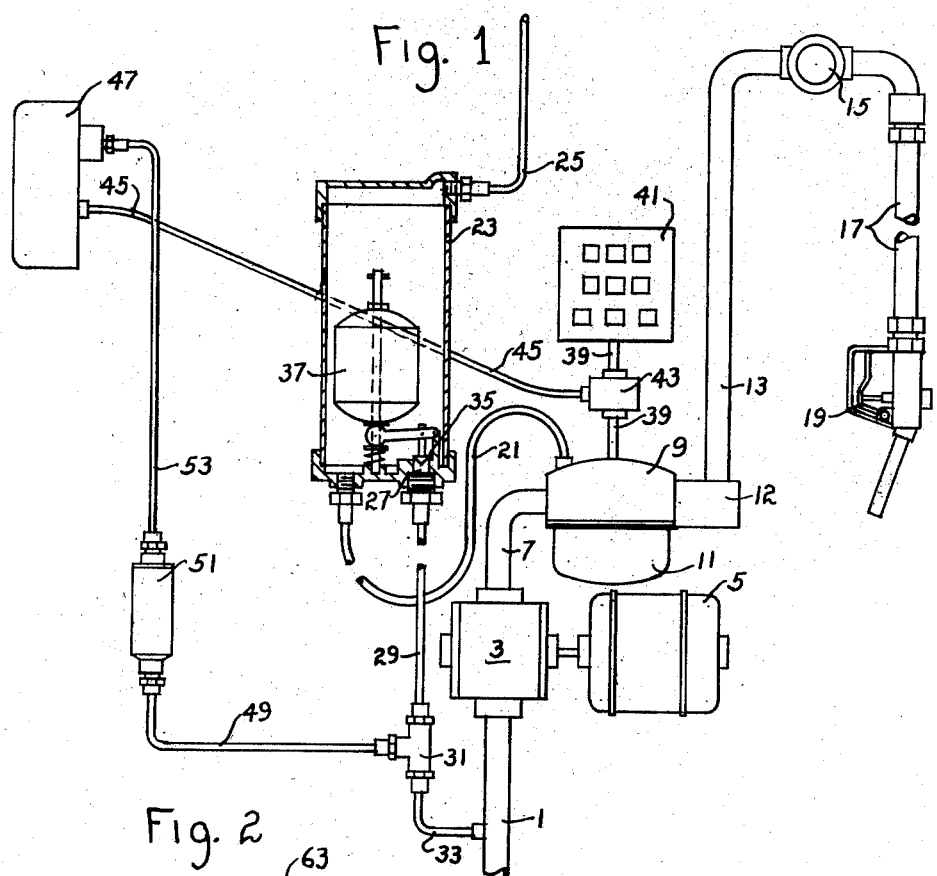
WALTER M. HARKS
INVENTOR.
BY Edmund W. E. Kamm
ATTORNEY Oct. 28, 1958
W. M. HARKS
2,858,048
INVENTORY CONTROL APPARATUS FOR
A LIQUID DISPENSING SYSTEM
Filed April 20, 1953
2 Sheets-Sheet 2
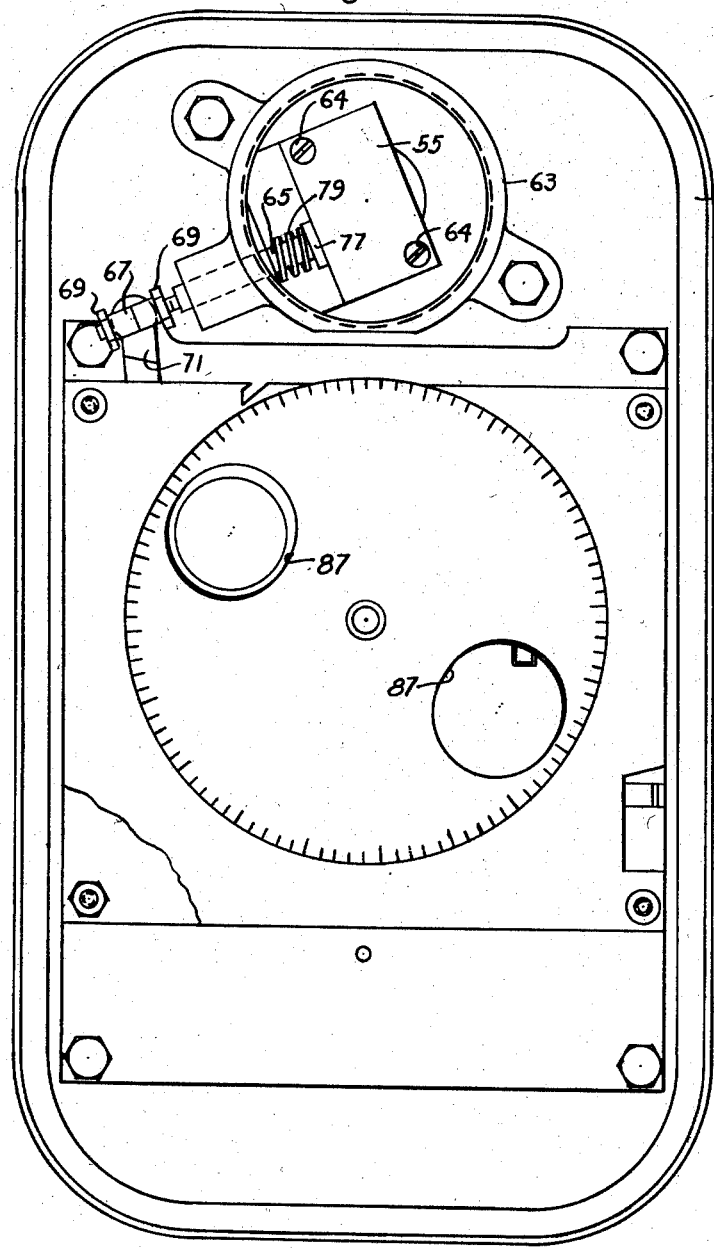
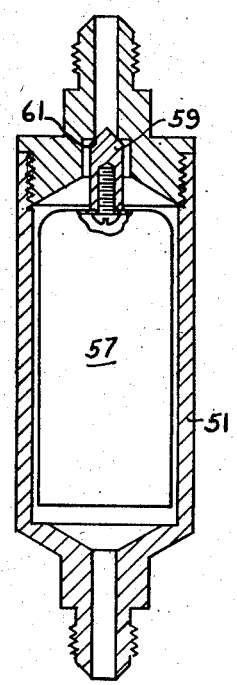
WALTER M. HARKS
*INVENTOR.*
BY Edmund W. E. Kamm
ATTORNEY

United States Patent Office 2,858,048
Patented Oct. 28, 1958

2,858,048

INVENTORY CONTROL APPARATUS FOR A LIQUID DISPENSING SYSTEM

Walter M. Harks, Fort Wayne, Ind., assignor to Petinco Systems, Inc., Fort Wayne, Ind., a corporation of Indiana Application April 20, 1953, Serial No. 349,690

3 Claims. (Cl. 222—26)

This invention relates to an inventory control apparatus for controlling the dispensing of liquids such as motor fuels from a tank. More specifically, it relates to an apparatus for preventing effective operation of the dispensing apparatus to withdraw liquid from the tank after the preestablished credit is exhausted.

The benefits and general purposes of an inventory control system such as that here involved are fully set forth in the patent to R. H. Damon et al., No. 2,247,480 issued July 1, 1941, for Inventory Control System and Apparatus.

The specific check presettable, predetermined stop mechanism which is employed in this apparatus is fully set forth in the patent issued to Charles H. Chapman et al., No. 2,634,845 issued April 14, 1953, for Check Operated Predetermined Stop Mechanism.

Briefly, the advantages of the inventory control system described in the Damon patent are that the bulk plant operator (wholesaler) can store products in the tanks at the retailer's place of business (service station) and by locking the tanks and placing a check controlled predetermined stop mechanism on each liquid dispenser connected to withdraw liquid from such tanks, the retailer is forced to prepay the liquid he requires. However, the retailer may pay in small increments, say 50 gallons at a time while the tanks are maintained reasonably full so that he is never without product to sell.

Thus, the wholesaler is able to market his products through retailers who might otherwise be poor credit risks; the retailer even though he does not have much money is assured of an adequate supply of product; the wholesaler has the advantage of a large underground storage capacity; the wholesaler can route maximum loads over minimum distances thus reducing the cost of transportation; the wholesaler can make deliveries at night reducing hazards.

The Damon and Chapman patents disclose a predetermined system in which the power supply to the dispenser controlled by such a system, is disabled to prevent dispensing.

The electrical wiring systems on this class of equipment must be fully explosion proof and this makes the installation in the field both difficult and expensive.

Further, in some cases it has been possible to use hand attachments for operating the dispensers even though the power supply is disconnected.

It is an object of the invention to provide a simple and inexpensive means for disabling the dispenser when the credit is exhausted.

Another object is to provide means for admitting air to the suction side of the pump of the dispenser to prevent delivery of liquid by it after credit is exhausted.

These and other objects will become apparent from a study of this specification and the drawings which are attached hereto, made a part hereof and in which:

Figure 1 is a diagrammatic view of the dispensing system.

Figure 2 is a sectional view of the air inlet valve and the operator therefor.

Figure 3 is an elevation, with parts removed, showing the check preset predetermined stop mechanism of Chapman modified with the air valve.

Figure 4 is a vertical sectional view of the float and chamber which prevent the improper discharge of liquid.

Referring first to Figure 1, the numeral 1 represents the suction pipe which connects a storage tank (not shown) with the inlet of the pump 3. The latter is connected to be driven by an electric motor 5 and has its discharge connected by pipe 7 to the inlet of an air separator chamber 9. The bottom portion of the latter communicates with the inlet of the liquid meter 11 and measured liquid is discharged from the meter through a combination check and relief valve 12, pipe 13, sight glass 15, hose 17 and nozzle 19.

The top of the air separator chamber 9 is connected through a restricted orifice (not shown) and tube 21 to a float chamber 23 which communicates to atmosphere through vent pipe 25. A liquid return circuit is established through port 27, line 29, T 31 and line 33 to the suction pipe 1. A valve 35, operated by float 37 in chamber 23, controls the flow of fluid through port 27.

The structure thus far described is conventional except for T 31.

The output shaft 39 of the meter 11 is connected to drive the register 41. A power take-off gear box 43, similar to that shown in Figure 4 of the Damon patent, is connected to be driven by the shaft 39 and serves to drive the flexible shaft 45 which serves to drive the predetermined stop mechanism 47 in the same manner as shown and described in the Damon and Chapman patents.

Connected to the T 31, in communication with the suction line 33 is a line 49 which communicates with the lower portion of a float chamber 51. The upper end of the chamber communicates through tube 53 with the valve body 55. A float 57 is mounted in the chamber 51 and carries a valve 59 at its upper end which cooperates with a seat 61 to close the tube 53 when the float is raised by liquid in the chamber.

The valve body 55 is mounted in the receptacle 63 by means of screws 64. A plunger 65 is slidably mounted in the receptacle 63 as illustrated in Figures 2 and 3. The outer end of the plunger is threaded and a sleeve 67 having hexagon end flanges 69 is screwed thereon. The flanges span the end of the lever 71 so that the motion thereof will be transmitted to the plunger. The receptacle, plunger, sleeve and lever are exactly the same as disclosed in the Chapman patent above referred to.

The inner end of the plunger presents a difference from the Chapman structure in that it is longitudinally bored and threaded at 73 to receive a screw 75 which serves to hold a valve 77 in place on the end of the plunger. A spring 79, confined between the receptacle and the valve urges the plunger and valve toward a position closing the port 81 in the valve body.

The receptacle 63 is vented to atmosphere by the port 83 formed in the cover 85 for the receptacle.

The lever 71 is rotated clockwise upon the presetting of the predetermining mechanism by the insertion of a check in the receiving holes 87 and in a counter-clockwise direction when the preset credit is exhausted, all as explained in said Chapman patent.

With these facts in mind, the operation of the structure described will be fairly obvious.

*Operation*

Assuming that a credit has been established on the predetermining mechanism and that the lever 71 has been rotated clockwise to the position of Figure 3, the plunger 65 will be moved to the right by spring 79 and will cause valve 77 to close the port 81.

In this way the supply of air through ports 83, 81, tube 53, chamber 51, tube 49, T 31, tube 33 to suction line 1 is closed off and the operation of the pump 3 will be effective to lift fuel from the tank and dispense it through the separator 9, meter 11, lines 13, 15, 17 and nozzle 19.

As the meter is actuated, it drives shaft 39 and register 41 to indicate the liquid dispensed and also drives the shaft 45, through gear box 43, so that the latter will actuate the predeterminer mechanism 47 to reduce the amount of credit preset thereon in proportion to the amount of liquid dispensed.

As soon as the amount of liquid delivered equals the credit, the lever 71 will move counter-clockwise to withdraw the valve 77 from the port 81 so that air will now be drawn into the pump through ports 83, 81, lines 53, 49, 31, 33 and 1.

The amount of air admitted exceeds the capacity of the pump, because the sizes of the ports and lines are so designed and therefore even though the pump 3 and motor 5 are operated, only air will be pumped. This air escapes through the said separator 9, line 21, float chamber 23 and vent 25 and the meter will accordingly be stopped.

In order to prevent liquid from being discharged through tube 53 and ports 81—83 as when the float chamber 23 is located above the ports 81—83 or due to possible expansion of liquid in the lines, the float chamber 51 is employed. As liquid enters the chamber, the float rises and the valve 59 is raised to close port 61 thus preventing the flow of liquid beyond the chamber.

As soon as further credit is established by the deposit of an additional check or checks, the valve 77 recloses port 81 and the pump 3, when started, will evacuate the air from the system, discharge it into separator 9 whence it escapes to atmosphere through the float chamber 23, and liquid will be drawn into the pump through suction line 1 and will be dispensed.

It is obvious that various changes may be made in the form, structure and arrangement of parts without departing from the spirit of the invention. Accordingly, applicant does not desire to be limited to the specific embodiment disclosed herein primarily for purposes of illustration; but instead, he desires protection falling fairly within the scope of the appended claims.

What I claim to be new and desire to protect by Letters Patent of the United States is:

1. In a liquid dispensing system comprising a pump having a suction and a discharge, an air separator connected to the discharge, a first float chamber connected to the air separator, a liquid return conduit connecting said first float chamber with the pump suction, a dispensing line, a meter connected to receive liquid from the separator and discharge it through the dispensing line, a register and a power take-off, both connected to be driven by the meter in proportion to the amount of liquid dispensed, a check presettable credit predeterminer mechanism disposed below said first float chamber, means connecting said mechanism to be driven by said power take-off for reduction of the preset credit in proportion to the amount of liquid dispensed and an actuator mounted for operation by said mechanism to a first position upon posting a credit and to a second position when credit is exhausted, the improvement which comprises a receptacle having an atmospheric port, said receptacle mounted to form a part of the predeterminer mechanism, a valve body having a port disposed within said receptacle, a valve movable relative thereto to open and close the port, means connecting said valve with said actuator for movement thereby to close the port when the actuator occupies its first position and a conduit connecting said port with the liquid return conduit, a second float chamber interposed in said conduit, a float in said second chamber, a float valve mounted on the float, a float valve port disposed in that portion of the conduit connecting said second float chamber with said valve port, said float valve being disposed to close said float valve port when the float is buoyed by liquid entering said second chamber.

2. In a liquid dispensing system, a pump, suction and discharge lines connected to the pump, an air separator connected to the discharge line, a float chamber connected to receive air and entrained liquid from the air separator, a liquid discharge line from the air separator, a meter connected to the liquid discharge line, a dispensing line receiving liquid from the meter, a register and a power take-off both having driving connections to the meter to be driven in proportion to the amount of liquid passing through the meter, a check presettable credit predeterminer mechanism, drive means connecting the power take-off to the credit mechanism to drive said mechanism for reduction of the preset credit in proportion to liquid passing through the meter, an actuator operatively connected to the credit mechanism for movement to a first position when a credit is set in the mechanism and to a second position when the credit is exhausted, a liquid return line from the float chamber to the suction line, an atmospheric pressure line connected to the liquid return line, and to a port, a valve associated with the port and movable to open and closed positions by said actuator, the valve being closed when the actuator is in the first position and open when it is in second position to vent the suction line to atmospheric pressure and prevent delivery of liquid by the pump.

3. In a liquid dispensing system, a pump, suction and discharge lines connected to the pump, an air separator connected to the discharge line, a float chamber connected to receive air and entrained liquid from the air separator, a liquid discharge line from the air separator, a meter connected to the liquid discharge line, a dispensing line receiving liquid from the meter, a register and a power take-off both having driving connections to the meter to be driven in proportion to the amount of liquid passing through the meter, a check presettable credit predeterminer mechanism, drive means connecting the power take-off to the credit mechanism to drive said mechanism for reduction of the preset credit in proportion to liquid passing through the meter, an actuator operatively connected to the credit mechanism for movement to a first position when a credit is set in the mechanism and to a second position when the credit is exhausted, a liquid return line from the float chamber to the suction line, an atmospheric pressure line connected to the liquid return line and to a port, a second float chamber connected in the atmospheric pressure line and communicating with said port, said second chamber having a valve seat adjacent its end toward the port in the atmospheric pressure line, a float in said second float chamber having a valve member to close said valve seat and prevent fluid from the suction line and from the first float chamber reaching the port, a valve associated with the port and movable to open and closed positions by said actuator, the valve being closed when the actuator is in the first position and open when it is in second position to vent the suction line to atmospheric pressure and prevent delivery of liquid by the pump.

References Cited in the file of this patent

UNITED STATES PATENTS

| | | |
|---|---|---|
| 867,587 | Moore | Oct. 8, 1907 |
| 2,365,192 | Hazard | Dec. 19, 1944 |
| 2,390,605 | Marvel | Dec. 11, 1945 |